E. SCHNEIDER.
ELASTIC SUSPENSION FOR WHEELED GUN CARRIAGES.
APPLICATION FILED FEB. 28, 1920.

1,347,916.

Patented July 27, 1920.
6 SHEETS—SHEET 1.

E. SCHNEIDER.
ELASTIC SUSPENSION FOR WHEELED GUN CARRIAGES.
APPLICATION FILED FEB. 28, 1920.
1,347,916.
Patented July 27, 1920.
6 SHEETS—SHEET 2.
Fig. 2.
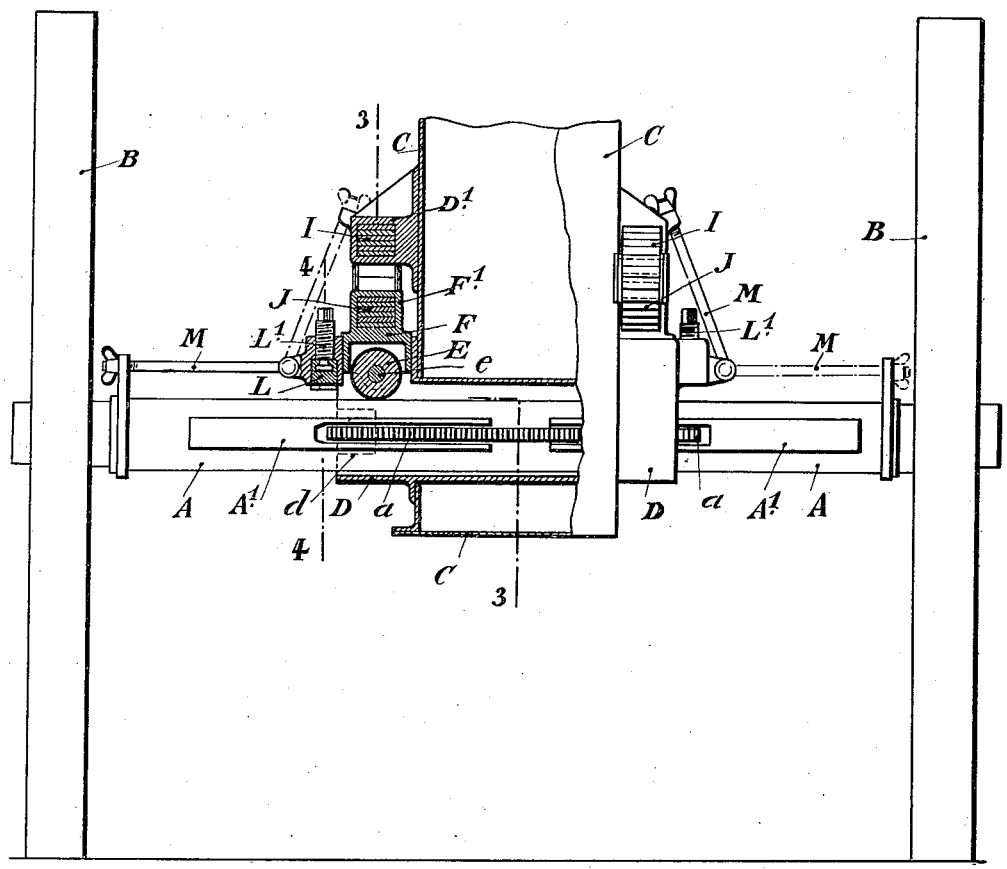
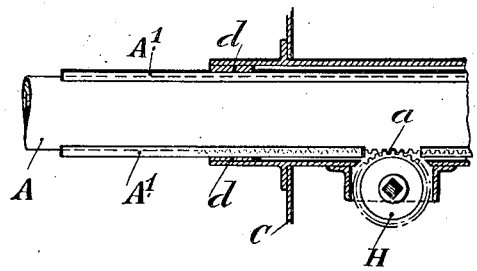
Fig. 5.
Inventor:-
Eugene Schneider
By Mauro, Cameron, Lewis & Massem
Attorneys.

E. SCHNEIDER.
ELASTIC SUSPENSION FOR WHEELED GUN CARRIAGES.
APPLICATION FILED FEB. 28, 1920.
1,347,916.
Patented July 27, 1920.
6 SHEETS—SHEET 3.
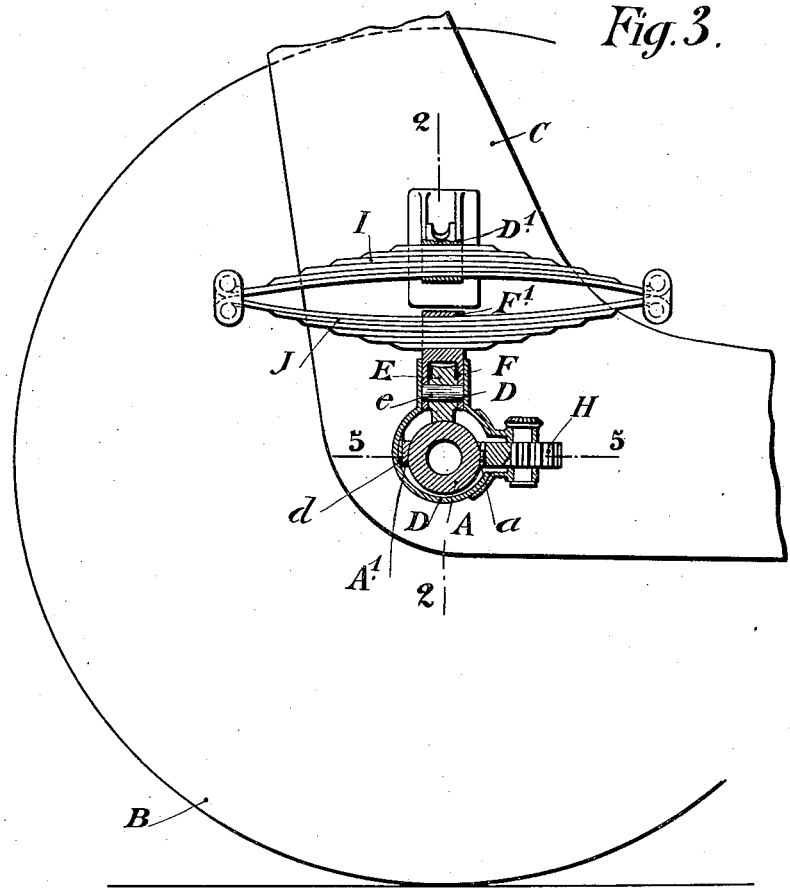
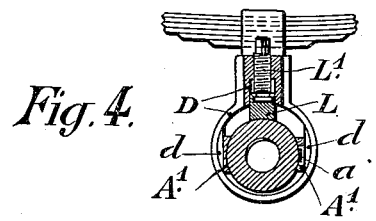

E. SCHNEIDER.
ELASTIC SUSPENSION FOR WHEELED GUN CARRIAGES.
APPLICATION FILED FEB. 28, 1920.

1,347,916.

Patented July 27, 1920.
6 SHEETS—SHEET 4.

Inventor:—
Eugene Schneider
By Mauro, Cameron, Lewis & Kirkham
Attorneys.

E. SCHNEIDER.
ELASTIC SUSPENSION FOR WHEELED GUN CARRIAGES.
APPLICATION FILED FEB. 28, 1920.

1,347,916.

Patented July 27, 1920.

E. SCHNEIDER.
ELASTIC SUSPENSION FOR WHEELED GUN CARRIAGES.
APPLICATION FILED FEB. 28, 1920.
1,347,916.
Patented July 27, 1920.
6 SHEETS—SHEET 6.
Fig. 10.
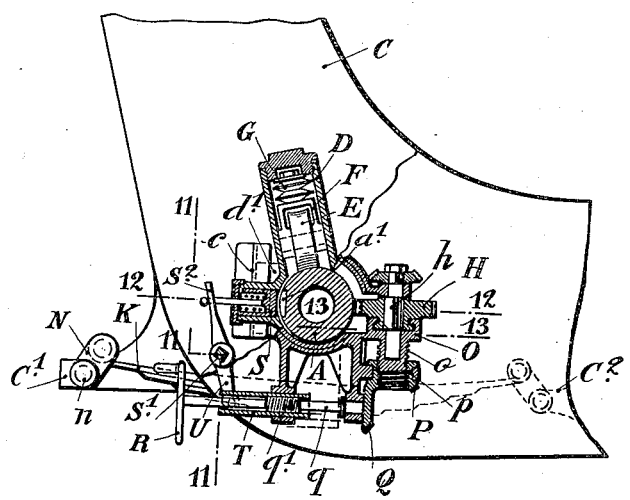
Fig. 12.
Fig. 13.
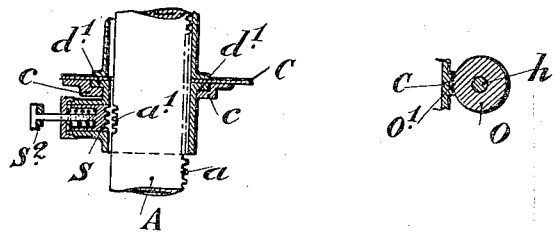

UNITED STATES PATENT OFFICE.

EUGÈNE SCHNEIDER, OF PARIS, FRANCE, ASSIGNOR TO SCHNEIDER & CIE., OF PARIS, FRANCE, A JOINT-STOCK COMPANY OF FRANCE.

ELASTIC SUSPENSION FOR WHEELED GUN-CARRIAGES.

1,347,916.     Specification of Letters Patent.     Patented July 27, 1920.

Application filed February 28, 1920. Serial No. 362,118.

*To all whom it may concern:*

Be it known that I, EUGÈNE SCHNEIDER, a citizen of the Republic of France, residing at 42 Rue d'Anjou, Paris, France, have invented new and useful Improvements in Elastic Suspension for Wheeled Gun-Carriages, which invention is fully set forth in the following specification.

This invention relates to gun carriages of the known type wherein the training of the gun is effected by sliding the gun carriage body along the axle of the carriage wheels.

Fig. 2 is a longitudinal vertical section on the lines 2—2 of Fig. 3, showing one of the constructional forms embodying the present improvement.

Fig. 3 is a vertical cross section on the line 3—3 of Fig. 2.

Fig. 4 is a partial section on the line 4—4 of Fig. 2.

Fig. 5 is a section on the line 5—5 of Fig. 3.

Fig. 10 is a similar partial cross section on the line 10—10 of Fig. 11.

In these figures, the parts are shown in the firing position.

Fig. 12 is a section on the line 12—12 of Fig. 10.

Fig. 13 is a section on the line 13—13 of Fig. 10.

Figure 6:
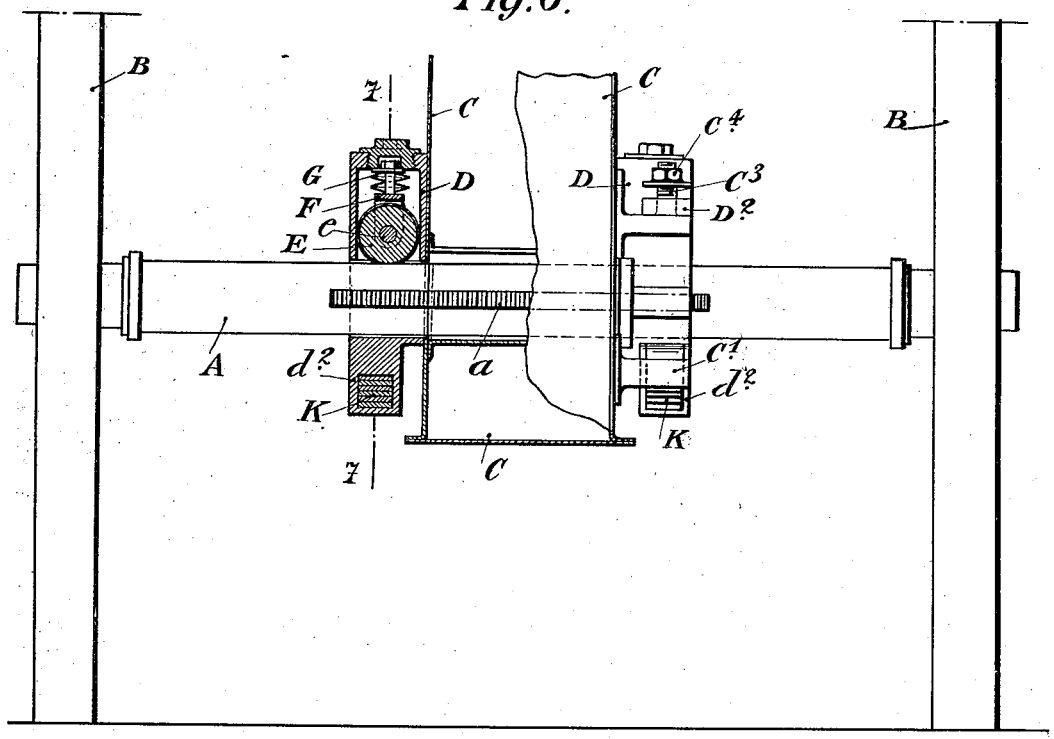
Fig. 6 is a longitudinal vertical section of a second constructional form embodying the present improvement.
Figure 1:
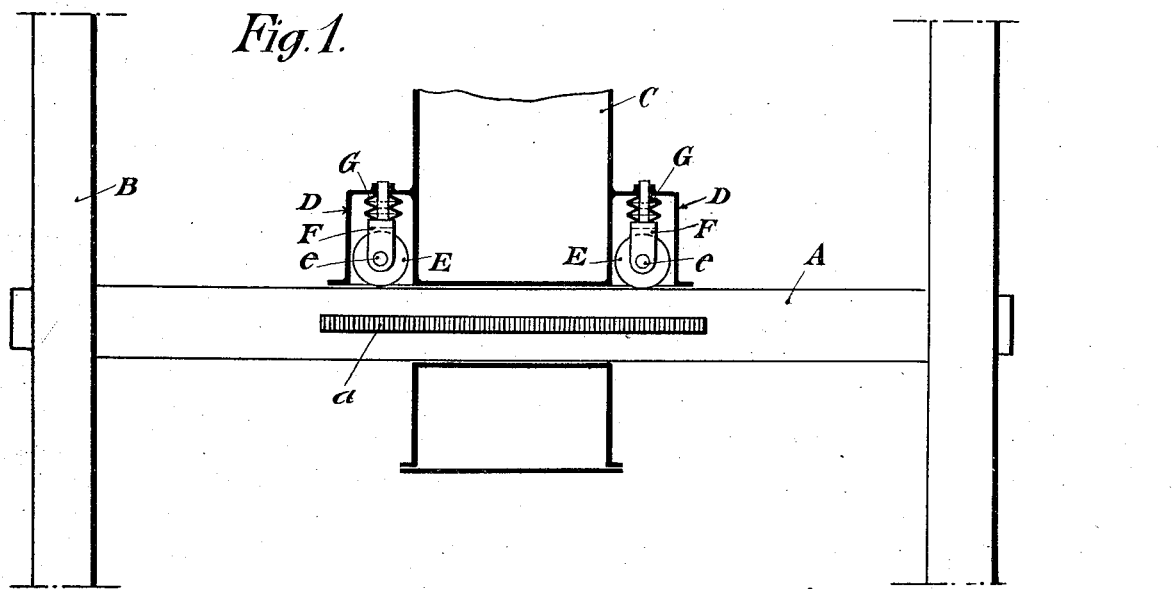
Figure 1 is a diagrammatic vertical section of a known type of gun mounting.
Figure 7:
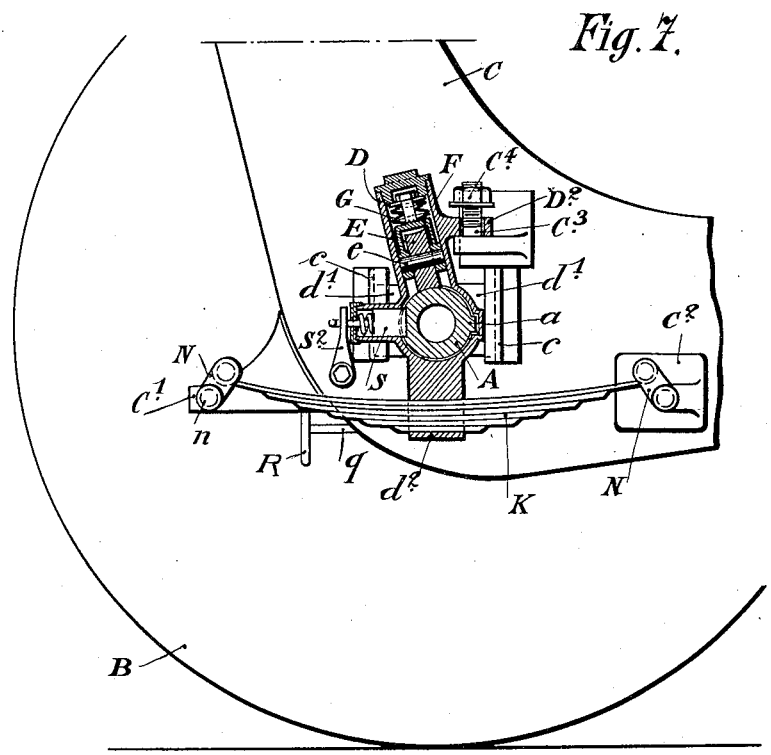
Fig. 7 is a vertical cross section on the line 7—7 of Fig. 6.
Figure 8:
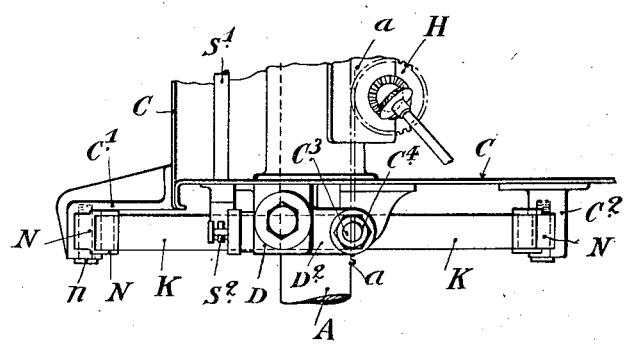
Fig. 8 is a partial plan corresponding to Fig. 7.
Figure 11:
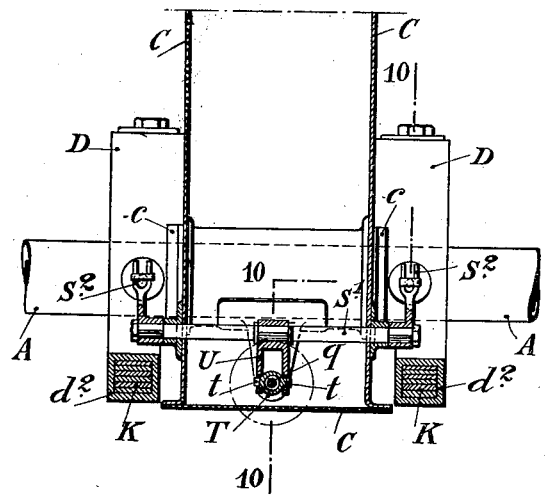
Fig. 11 is a section on the line 11—11 of Fig. 10.
Figure 9:
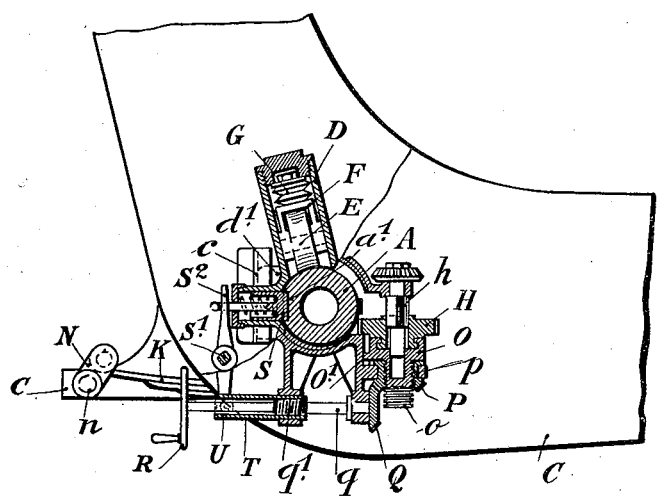
Fig. 9 is a partial cross section showing the parts in position for transport.

In this known type of gun carriages illustrated in the accompanying drawings in Fig. 1 in diagrammatic vertical section along the axis of the axle A of the wheeled axle B—A—B. The carriage body C is slidable along the axle by means of a suitable gear comprising a pinion meshing with a rack *a* formed on the said axle. The carriage body carries two boxes D, D containing rollers E. Between each of the blocks F carrying the axle-pins *e* of these rollers and the end of the corresponding box D, there is provided a spring G such as a pile of Belleville washers. These springs do not constitute an elastic suspension for the gun carriage during transport; they merely relieve the axle during the firing by raising slightly the gun carriage when the gun is in battery position, so that the firing stresses first compress the Belleville washers.

According to the present invention a real elastic suspension is interposed between the gun carriage body C and the boxes D. For this purpose, the boxes D instead of being fixed to the gun carriage body, may be arranged in such a manner as to allow a vertical sliding motion to take place between them and the gun carriage body. The present arrangements of boxes fixed to the gun carriage body may also be retained by constructing them in such a manner that they comprise a buckle for one of the elements of a pair of leaf springs, the buckle of the other element being carried by the block F of the support for the axle-pin *e* of the corresponding roller.

Figs. 2 to 5 inclusive illustrate a constructional form designed on the last stated principles.

In these figures, B—A—B designates, as in the diagrammatic Fig. 1, the wheeled axle along the axle A of which the gun carriage body is adapted to slide for training the gun. For this purpose the axle carries a rack *a* over which rolls a pinion H carried by the gun carriage, and actuated by a suitable gear.

According to the present invention the boxes D which are fixed to the gun carriage body C and in which are guided the blocks F carrying the axle-pins *e* for the rollers E, comprise each a buckle D¹ for a leaf spring I arranged transversely of the axis of the axle. This spring I is operatively connected to a leaf spring J for which a buckle F¹ is formed on the corresponding block F.

In this manner a real elastic suspension is provided between the gun carriage body C and the supporting blocks of the rollers E rolling in contact with the axle A.

In each of the boxes D a shoe L is mounted on the lower end of a screw spindle L¹ working in a corresponding screw-thread tapped in the box D. For firing, the shoes L are brought into contact with the axle A (Fig. 4) in such a manner as to prevent the suspension springs from receiving the stresses due to the percussion. For transport, the shoes are raised into the position shown in Figs. 2 and 3; at the same time all shifting of the gun carriage along the axle is prevented by means of bolts M which are lowered into the position indicated by full lines on the left of Fig. 2. In firing these bolts are fixed in the position shown in full lines on the right of Fig. 2.

The boxes D that surround the axle with their lower parts, are formed on their inner walls with flats $d$ (Figs. 3, 4 and 5) upon which are adapted to bear corresponding ribs A¹ projecting from the axle. This arrangement provides a suitable surface for guiding the boxes on the axle in the vertical direction as well as in the horizontal direction, and affords at the same time bearing surface of sufficient area for pulling the axle by means of the gun carriage during transport.

Figs. 6 to 13 inclusive illustrate a constructional form of this invention wherein the roller boxes are independent of the gun carriage body; a mutual guidance being assured between the latter and the said boxes.

In this example, the boxes D in which the rollers E are mounted in the usual manner shown in the diagrammatic Fig. 1, are guided by means of ribs $d^1$ (Fig. 12) in corresponding guide grooves $c$ formed in the side plates of the gun carriage. Each box surrounds the axle, and its lower portion is formed as a buckle $d^2$ for a leaf spring K, the longest leaf of which is jointed by means of links N (Fig. 7) to axle-pins $n$ carried by brackets C¹, C² on the side plates of the gun carriage.

The gun carriage body C is, as shown, suspended elastically from the boxes D along which it can slide during transport; normally these boxes bear upon the axle by means of the rollers E.

For firing, the boxes D may be fixed to the gun carriage C. For this purpose the said boxes are formed with lugs D² guided during transport by screw threaded stems C³ carried by the side plates C of the gun carriage. Each of these stems is fitted with a nut C⁴ which can be brought into contact with the lug D² so as to form a firm connection between the boxes D and the gun carriage.

Since the pinion H which meshes with the last toothed wheel of the driving transmission for sliding the gun carriage along the axle A, is carried by the gun carriage body C, and is subjected during transport to the oscillatory motion of the said body relatively to the wheeled axle, the invention also consists in providing an apparatus for moving the said pinion out of gear, that is to say, for keeping it out of gear with the rack $a$.

For this purpose the pinion H is adapted to slide along a square portion of its shaft $h$. It is capable of rotating in a bracket O formed on a screw-threaded stem $o$ working in a nut $p$ pivoted in the gun carriage body C, and fixed to a bevel pinion P. The bracket O is prevented from rotating by the engagement of a nib O¹ (Fig. 13) in a groove formed in the gun carriage C. Rotational motion of the nut $p$ and pinion P, intended to cause the bracket O to move down so as to bring the pinion H out of gear, is imparted to it by the actuation of a pinion Q fixed on a shaft $q$ which is journaled in the gun carriage body C and carries an operating hand wheel R.

This mechanism for moving the pinion H into and out of gear may be operatively combined with a mechanism for bringing into and out of operation two bolts S situated opposite sockets $a^1$ formed in the axle A, and serving for locking the gun carriage to the axle during transport.

For this purpose, a tapped sleeve T guided in the gun carriage body, forms a nut for a screw-threaded portion $q^1$ of the shaft $q$. This sleeve which receives through the operation of the hand wheel R, a movement along its axis, moves with it by means of two side studs $t$ (Fig. 11) a forked lever U fixed on an axle S¹ which is journaled in the gun carriage body and carries two forked levers S² engaging the tails of the bolts S. The moving of the bolts out of the way is effected simultaneously with the throwing of the pinion H into gear.

The engagement of the bolts is assured by their springs, owing to the pivotal movement of the levers S² toward the axle, which movement is caused by the disengaging movement of the pinion H.

Having now particularly described and ascertained the nature of our said invention and in what manner the same is to be performed, we declare that what we claim is:—

1. The combination of a wheeled axle, a vertically movable gun carriage slidable along the wheeled axle for training the gun, a connection between the wheeled axle and the gun carriage including a suspension spring to carry the load of the gun carriage during transport, and means apart from the suspension spring to transmit the load of the gun carriage to the wheeled axle during firing.

2. The combination of a wheeled axle, a vertically movable gun carriage slidable along the wheeled axle for training the gun, an element movable with the gun carriage and carrying a roller to bear on the wheeled axle, a connection between the gun carriage and said element including a suspension spring to carry the load of the gun carriage during transport, and means apart from the suspension spring to transmit the load of the gun carriage to the wheeled axle during firing.

3. The combination of a wheeled axle, a vertically movable gun carriage slidable along the wheeled axle for training the gun, a box slidable along the wheeled axle with the gun carriage, an element movably mounted in said box carrying a roller to bear on the wheeled axle during the travel of the box with the gun carriage, a connection between the gun carriage and said element including a suspension spring to carry the load of the gun carriage during transport, and means apart from the suspension spring to transmit the load of the gun carriage to the wheeled axle during firing.

4. The combination of a wheeled axle, a vertically movable gun carriage slidable along the wheeled axle for training the gun, a box engaging the wheeled axle and having a sliding engagement with the gun carriage, a suspension spring connecting the gun carriage with the box to carry the load of the gun carriage during transport, and means for rigidly connecting the box and gun carriage during firing.

5. The combination of a wheeled axle, a vertically movable gun carriage slidable along the wheeled axle for training the gun, a box engaging the wheeled axle and having a sliding engagement with the gun carriage, a leaf spring attached at its ends to the gun carriage and connected between its ends with box, said spring serving to carry the load of the gun carriage during transport, and means for rigidly connecting the box and gun carriage during firing.

6. The combination of a wheeled axle, a vertically movable gun carriage slidable along the wheeled axle for training the gun, a box engaging the wheeled axle and having a sliding engagement with the gun carriage, releasable means for locking the box to the gun carriage during firing to transmit the shock of discharge directly from the gun carriage through the box to the wheeled axle, and a suspension spring connecting the gun carriage with the box to carry the load of the gun carriage during transport on release of the locking means.

7. The combination of a wheeled axle, a vertically movable gun carriage slidable along the wheeled axle for training the gun, a box engaging the wheeled axle and having a sliding engagement with the gun carriage, a roller carried by the box and riding on the wheeled axle, releasable means for locking the box to the gun carriage during firing to transmit the shock of discharge directly from the gun carriage through the box and roller to the wheeled axle, and a suspension spring connecting the gun carriage with the box to carry the load of the gun carriage during transport on release of the locking means.

8. The combination of a wheeled axle, a gun carriage slidable along the wheeled axle for training the gun, a box engaging the wheeled axle and connected with the gun carriage and slidable with the latter along the wheeled axle, a connection between the gun carriage and the box including a suspension spring to carry the load of the gun carriage during transport, and releasable means for holding the box and connected gun carriage stationary on the wheeled axle during transport.

9. The combination of a wheeled axle, a gun carriage slidable along the wheeled axle for training the gun, a box connected with the gun carriage and engaging the wheeled axle, and a bolt movable in the box to engage the wheeled axle to hold the gun carriage stationary on the wheeled axle.

10. The combination of a wheeled axle having a longitudinal rack, a gun carriage slidable along the wheeled axle for training the gun, a box connected with the gun carriage and engaging the wheeled axle, an adjustable gear mounted on the box to engage said rack, means for rotating the gear engaged with the rack to move the box and connected gun carriage along the wheeled axle, and means for disengaging the gear from the rack.

11. The combination of a wheeled axle having a longitudinal rack, a gun carriage slidable along the wheeled axle for training the gun, a box connected with the gun carriage and engaging the wheeled axle, an adjustable gear mounted on the box to engage said rack, means for rotating the gear engaged with the rack to move the box and connected gun carriage along the wheeled axle, means for disengaging the gear from the rack, and a bolt movably mounted in the box to engage the wheeled axle to hold the box and connected gun carriage stationary on the wheeled axle during the disengagement of the gear from the rack.

12. The combination of a wheeled axle having a longitudinal rack, a gun carriage slidable along the wheeled axle for training the gun, a box connected with the gun carriage and engaging the wheeled axle, an adjustable gear mounted on the box to engage said rack, means for rotating the gear engaged with the rack to move the box and connected gun carriage along the wheeled axle, means for disengaging the gear from the rack, a bolt movably mounted in the box to engage the wheeled axle to hold the box and connected gun carriage stationary on the wheeled axle during the disengagement of the gear from the rack, and means for simultaneously disengaging the gear from the rack and moving the bolt into engagement with the wheeled axle.

In testimony whereof I have signed this specification.

EUGÈNE SCHNEIDER.

Witnesses:
ANDRÉ MOSTICKER,
LOUIS GARDET.